United States Patent [19]
Lin

[11] Patent Number: 5,735,577
[45] Date of Patent: Apr. 7, 1998

[54] ADJUSTING MECHANISM FOR USE ON THE ARMREST OF A VEHICLE'S SEAT

[75] Inventor: Kuan-Jen Lin, Chia-Yi, Taiwan

[73] Assignee: Gentle Pao Industry Co., Ltd., Chia-Yi, Taiwan

[21] Appl. No.: 771,926

[22] Filed: Dec. 23, 1996

[51] Int. Cl.⁶ .................................................. A47C 7/54
[52] U.S. Cl. ............................. 297/411.36; 297/353
[58] Field of Search ...................... 297/353, 411.36; 248/118.3, 125.1, 354.7, 409

[56] References Cited

U.S. PATENT DOCUMENTS

| | | | |
|---|---|---|---|
| 4,684,129 | 8/1987 | Andersen et al. | 248/354.7 |
| 5,286,088 | 2/1994 | Taylor et al. | 297/353 |
| 5,324,096 | 6/1994 | Schultz | 297/411.36 |
| 5,388,892 | 2/1995 | Tornero | 297/411.36 |
| 5,588,766 | 12/1996 | Lai | 297/411.36 |
| 5,597,204 | 1/1997 | Karaus, Jr. | 297/411.36 |
| 5,620,233 | 4/1997 | Corwin | 297/353 |

Primary Examiner—Peter M. Cuomo
Assistant Examiner—Anthony D. Barfield
Attorney, Agent, or Firm—Browdy and Neimark

[57] ABSTRACT

An improved armrest adjusting mechanism for use on a vehicle's seat is provided with a slide board housed in an adjusting bracket. The slide board has a dentate portion having a plurality of dents which are in retaining engagement with a pivotal retaining ratchet secured to the adjusting bracket. The adjusting bracket can only be pulled upwardly in adjustment so as to make the armrest extended. The lowering of the armrest can be easily effected by pulling the adjusting bracket all the way up its top end, taking the retaining ratchet out of the moving path of the dentate portion of the slide board with the ratchet retained in place by a locking pole which is brought to the bottom of an elliptic through hole when the adjusting bracket is pulled to its top end. Then, the adjusting bracket is pushed downwardly and the retained locking pole will be pushed out of retaining engagement with the spring biased retaining ratchet and the locking pole moves to the top end of the elliptic through hole. The retaining ratchet resumes its retaining engagement with the dents of the dentate portion of the slide board so as to complete the adjustment.

1 Claim, 8 Drawing Sheets

ADJUSTING MECHANISM FOR USE ON THE ARMREST OF A VEHICLE'S SEAT

BACKGROUND OF THE INVENTION

The present invention relates to an improved adjusting mechanism for variation of the position of the armrest of a vehicle's seat. The adjusting mechanism is provided with a sliding board slidably received in an adjusting bracket. The sliding board which is fixed to the vehicle has a dentate portion engaged with a retaining ratchet secured to the adjusting bracket so that the adjusting mechanism can only be pulled upwardly to make the armrest extend in adjustment. To make the adjusting mechanism move down to lower the armrest, the adjusting mechanism must be pulled all the way up to its top limit, taking the retaining ratchet out of engagement with the dentate portion of the slide board with the ratchet held by a locking pole. The adjusting mechanism is then pushed downwardly to set the retained ratchet and the locking pole free so as to effect downward adjustment of the armrest on the adjusting mechanism.

The armrest of a vehicle or a public bus seat is usually not adjustable, so the hands of passengers on a bus having different physical sizes generally do not fit well in a seat, making passengers feel uncomfortable. To overcome such a problem, a prior art adjustable armrest, as shown in FIG. 1, was developed and applied to vehicle seats.

This prior art armrest has the following drawbacks in practical operation:

1. Such conventional armrest adjusting mechanism must be operated by two hands at the same time to vary the height of the armrest with one hand actuating the control lever to one direction and the other hand varying the position of the armrest. It is very inconvenient for a handicapped person to make the adjustment.

2. The conventional armrest adjusting mechanism is operated in a relatively tedious manner and is hard to handle by children.

3. The control lever is easily damaged so as to make a normal adjustment difficult frequently.

SUMMARY OF THE INVENTION

The primary object of the present invention is to provide an improved adjusting mechanism for varying the position of the armrest of a vehicle seat at will simply by pulling the armrest upward when the armrest is to be set at a higher position and by pulling the armrest to the top limit and then pushing downward to a lower position when the position of the armrest is to be lowered down.

Another object of the present invention is to provide an improved armrest adjusting mechanism which enables a person to make adjustment of the height of the armrest on the adjusting mechanism of a vehicle seat by simply pulling up or pushing down the armrest with one hand in relation to the fixed sliding board.

One further object of the present invention is to provide an improved armrest adjusting mechanism having a retaining hook which can be easily released by simply pulling up or pushing down the armrest directly for adjustment of the position of the armrest, effectively reducing the chance of malfunction resulting from improper operation.

DETAILED DESCRIPTION OF THE PREFERRED EMBODIMENT

Figure 1:
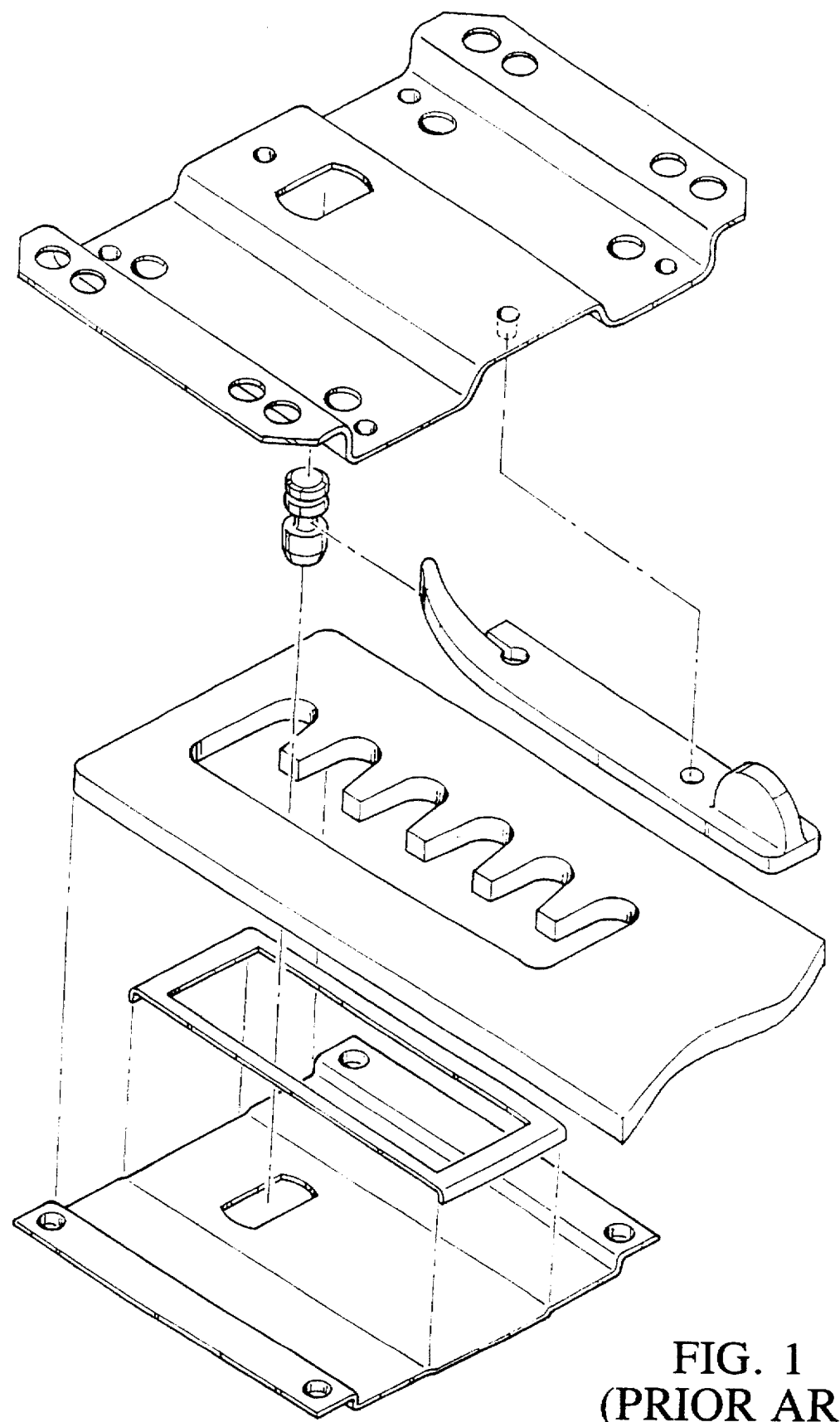
FIG. 1 is a diagram showing a conventional armrest adjusting mechanism.
Figure 2:
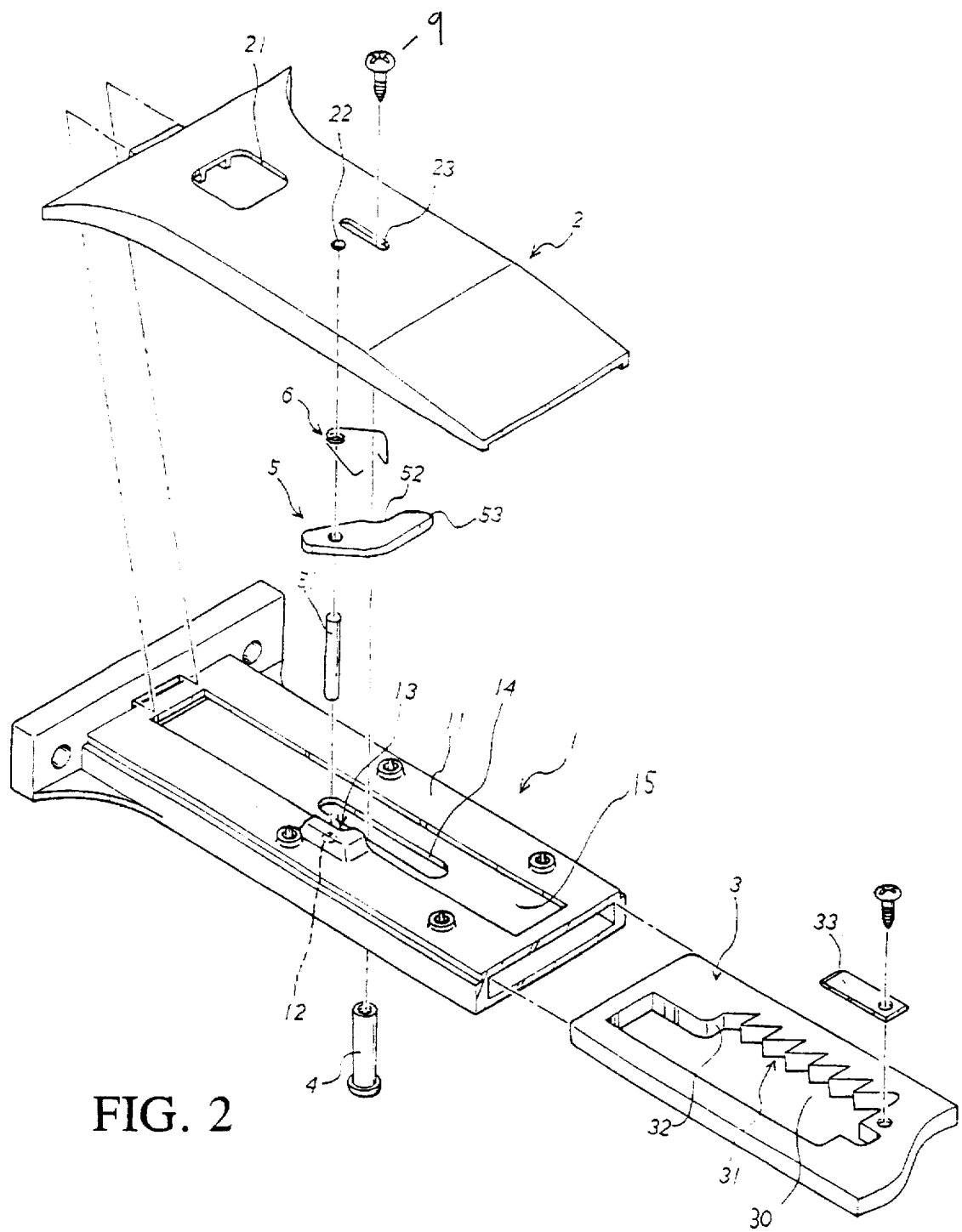
FIG. 2 is a diagram showing the exploded components of the present invention.

Referring to FIG. 2, the armrest adjusting mechanism of the present invention is mainly comprised of an adjusting bracket 1, a cover 2, a slide board 3, fixed to a vehicle (not shown) a locking pole 4, a retaining ratchet 5 and a bias spring 6.

Figure 3:
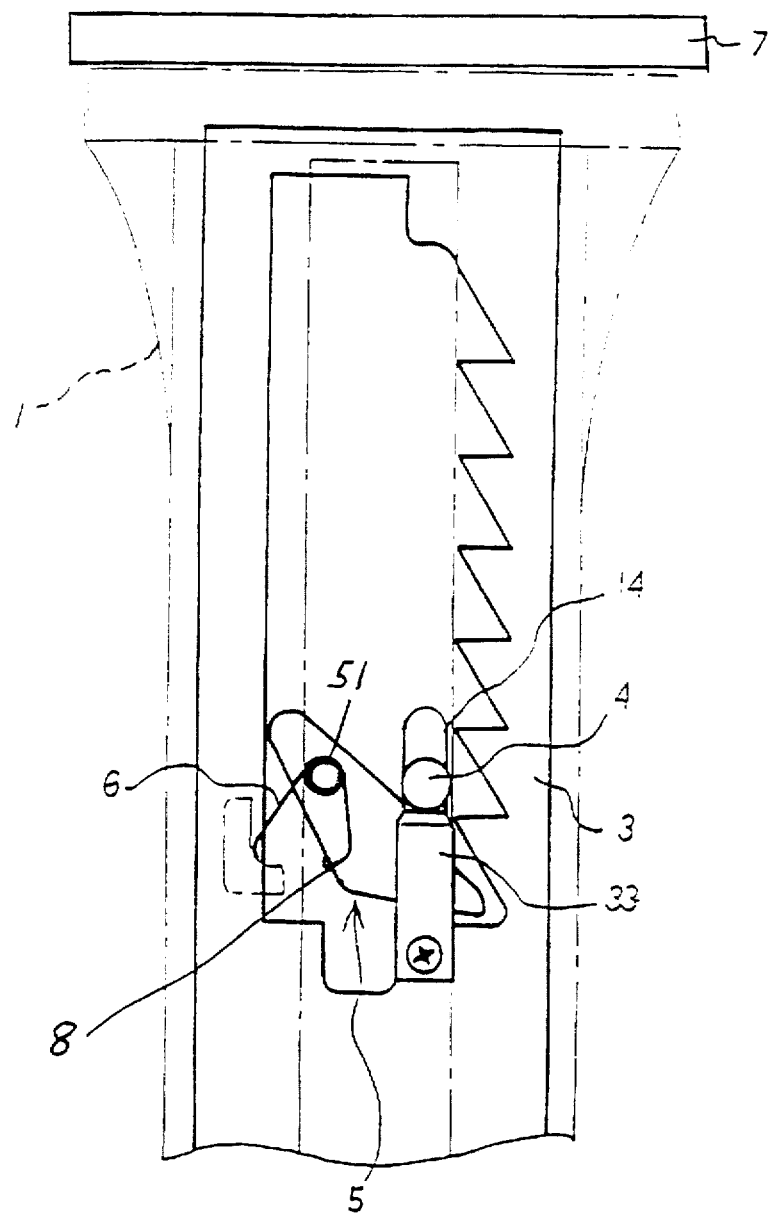
FIG. 3 is a diagram showing the assembly of the present invention.

The adjusting bracket 1 made in the form of an armrest engaged to the top of adjusting bracket 1 is shown in FIG. 3, has a hollow interior for housing the slide board 3 fixed to the vehicle. An elongated groove 15 is disposed on a securing face 11, to which the cover 2 is removably attached, to the adjusting bracket 1. At the center of the groove 15 is disposed an elliptic through hole 14, as shown in FIG. 2. On the edge of the elongated groove 15 and right next to the elliptic hole 14 is disposed a curve-faced block 13. On the opposite face of the elongated groove 15 and near the opposite of the block 13 is defined a shaft hole 12.

Secured to the adjusting bracket 1 is the cover 2 having a square hole 21 disposed near one end thereof and a hole 22 in alignment with the shaft hole 12. An elliptic hole 23 in correspondence to the through hole 14 is disposed at the center of the cover 2. p The slide board 3 has a central opening 30 having a dentate portion 31 with which the pivotal retaining ratchet 5 on adjusting bracket 1 can be engaged to slide board 3 for locking purpose. At one end of the dentate portion 31 is disposed a protrude shoulder 32. To the opposite end of the dentate portion 31 is secured an extended limiting member 33 by a screw.

The bolt-like locking pole 4 is led through the elliptic through hole 14 of the adjusting bracket 1 and further the slide board 3 and is slidably engaged in through hole 14 by a screw 9 extending through slot 23 fastened to pole 4.

The retaining ratchet 5 is pivotally engaged with a shaft 51 which extends through the shaft hole 12 of the adjusting bracket 1 and the opening 30 of the slide board 3 and the retaining ratchet 5 and the bias spring 6 and the hole 22 of the cover 2 sequentially. The retaining ratchet 5 has a retaining portion 53 and a curved sliding portion 52. The bias spring 6 is approximately V-shaped and has one end hooked inwardly.

In assembly, the slide board 3 is first inserted into the hollow interior of the adjusting bracket 1 and the bolt-like locking pole 4 is led through the elliptic through hole 14 of the adjusting bracket 1 and the housed slide board 3. Then the retaining portion 53 of the retaining ratchet 5 is engaged with the dentate portion 31 and the ratchet 5 is pivotally mounted onto the shaft 51 which is located in the hole 12. Afterwards, the bias spring 6 is attached to the shaft 51 and is fixed in between the curve-faced block 13 and the retaining ratchet 5 with the hooked end 8 in hooking engagement with the retaining ratchet 5, as shown in FIG. 3.

Next, the cover 2 is engaged with the securing face 11 of the adjusting bracket 1 with the shaft 51 passing through the hole 22 and the locking pole 4 slidably engaged in through hole 14 secured in place by a screw 9 extending through the elliptic hole 23 to complete the assembly.

Figure 4:
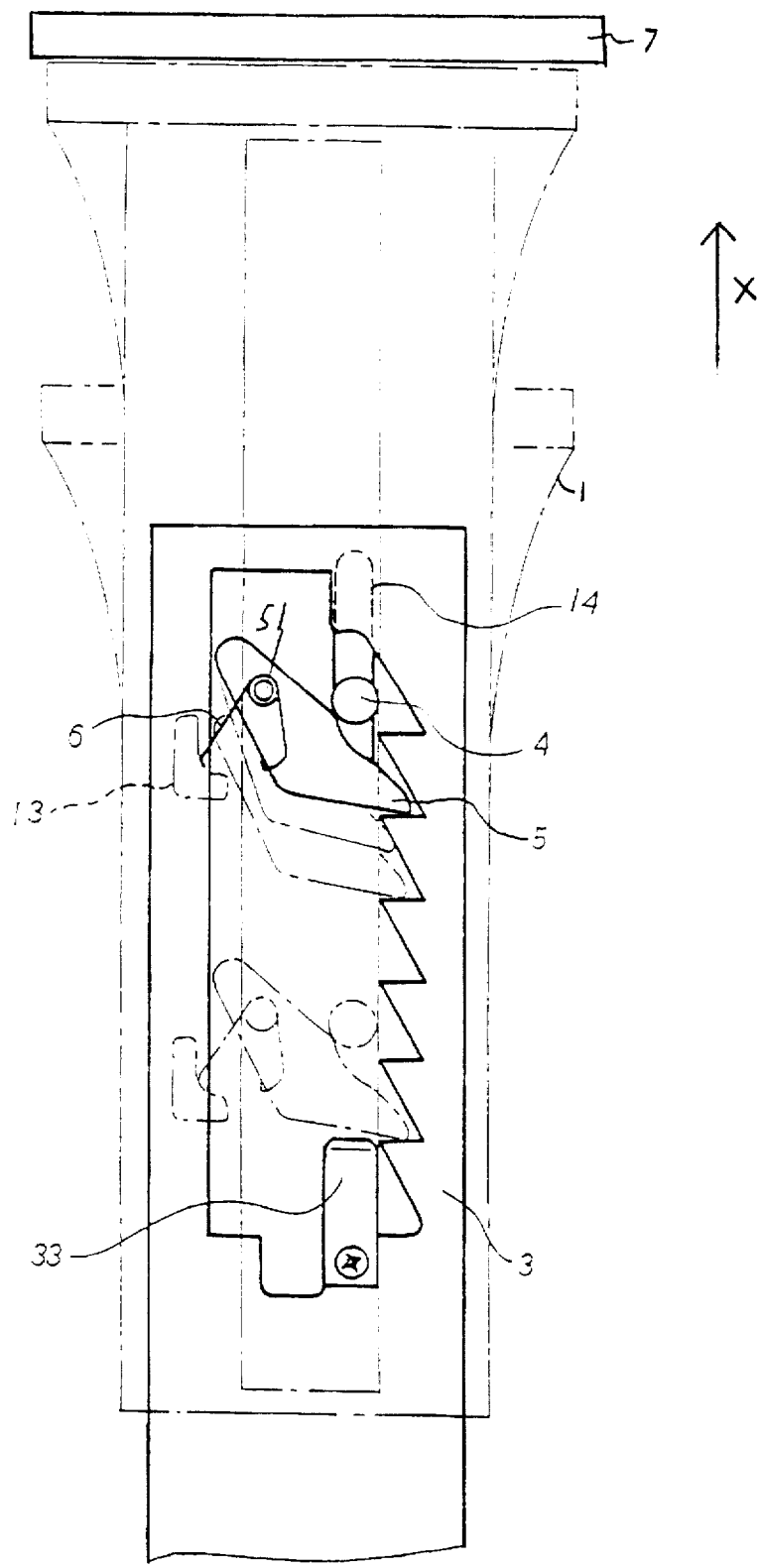
FIG. 4 is a diagram showing the upward adjustment of the armrest of the present invention.

In practical operation the retaining portion 53 of the retaining ratchet 5 is retained in the dentate portion 31 first, and when the adjusting bracket 1 is pulled upwardly, the retaining ratchet 5 will be pivoted by the dents of the dentate portion 31 to press against the bias spring 6, permitting the adjusting bracket 1 to be adjusted upwardly, in the direction of arrow 4 as shown in FIG. 4. When the adjusting bracket 1 is forced downwardly, as shown in FIG. 4, the dents of the dentate portion 31 will move against the retaining ratchet 5 constantly biased by the bias spring 6, resulting in the limiting of the downward movement of the adjusting bracket 1. So, the armrest can be only adjusted in the present situation.

Figure 5:
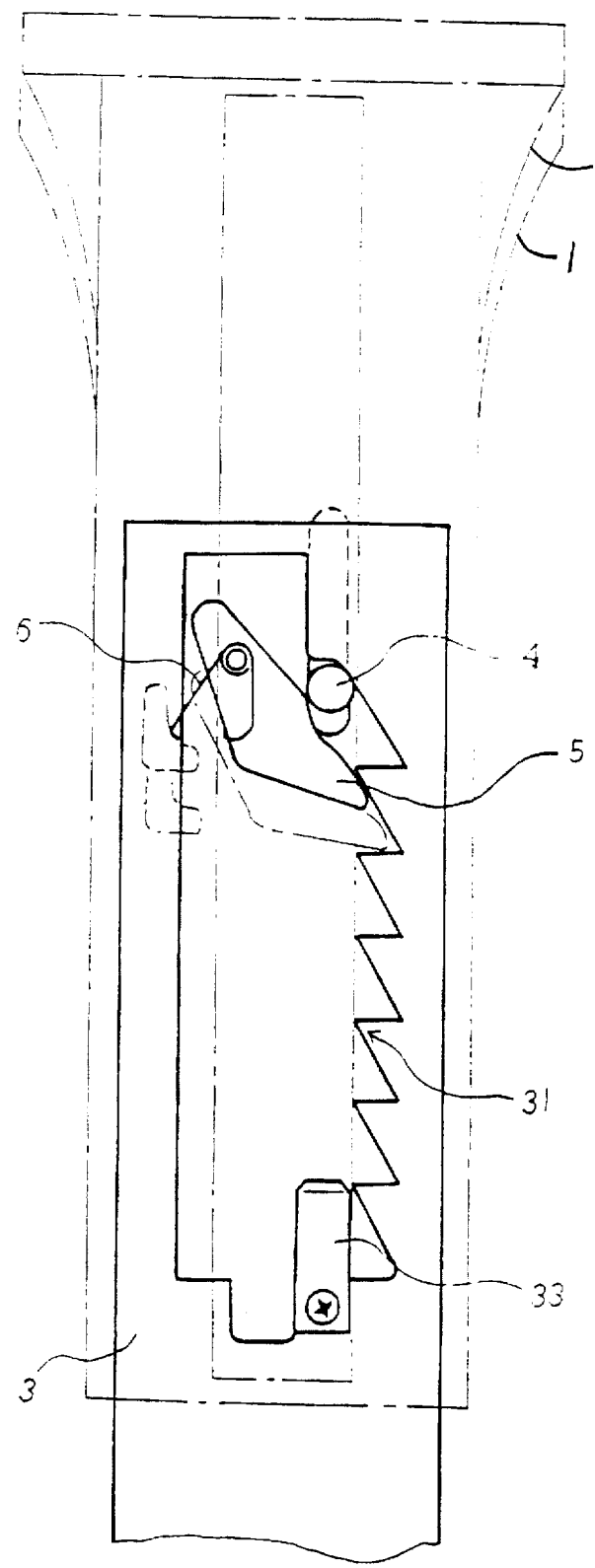
FIG. 5 is a diagram showing the operation of the retaining ratchet of the present invention.
Figure 6:
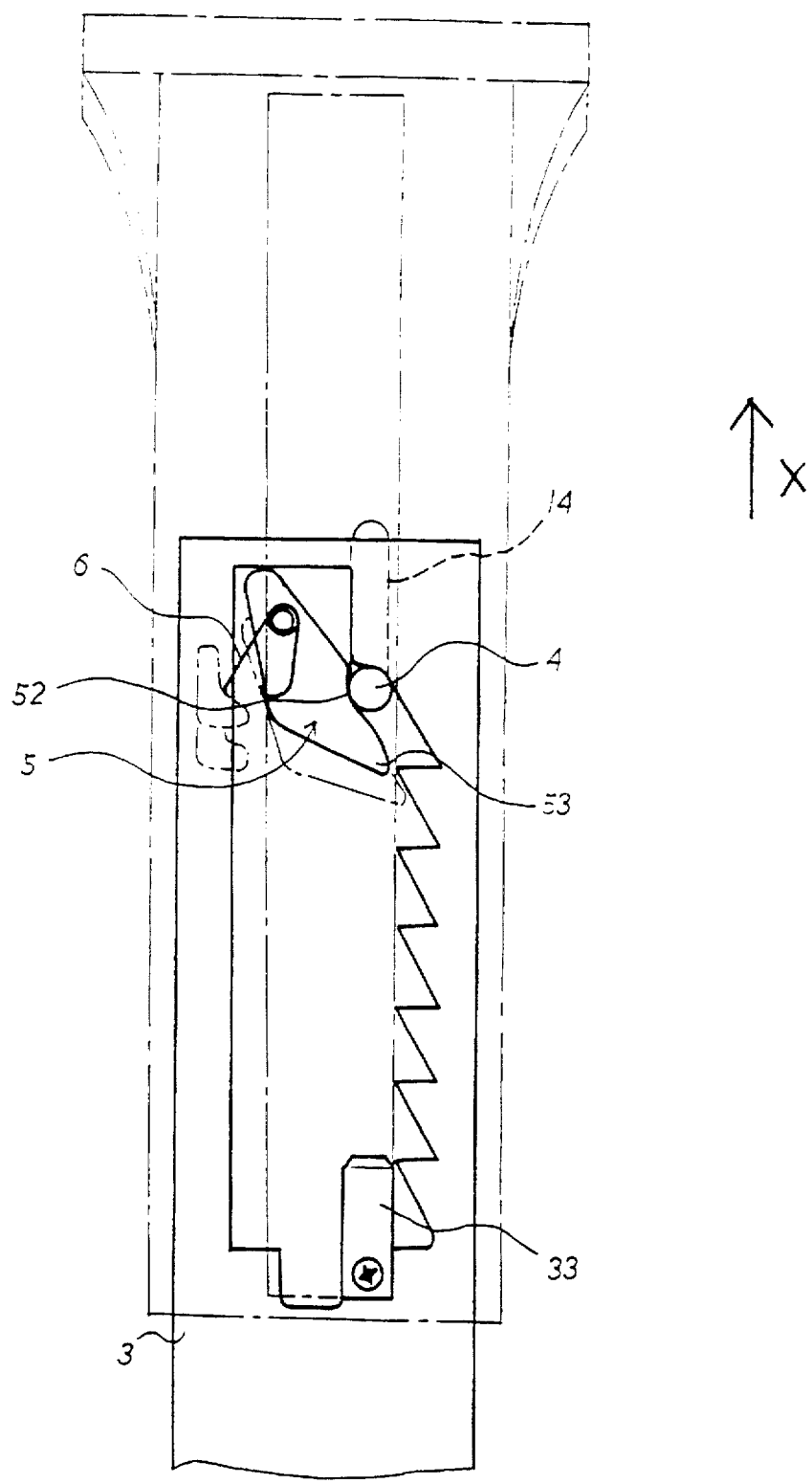
FIG. 6 is a diagram showing the disengagement of the retaining ratchet of the present invention.

As the armrest of the present invention is to be adjusted downwardly, the adjusting bracket is first pulled upwardly in the direction of arrow k all the way to its top limit, causing the protruded abutment shoulder 32 on slide board 3 to bring the bolt-like locking pole 4 on adjusting bracket 1 to the bottom end of the elliptic through hole 14 with the locking pole 4 falling into retaining engagement with the curved sliding portion 52 of the retaining ratchet 5 as shown in FIG. 6. In such case, the retaining ratchet 5 is pivoted against the bias spring 6 by the locking pole 4 in such a manner that the retaining portion 53 of the retaining ratchet 5 is pivoted out of the linear moving path of the dentate portion 31 of the slide board 3, as shown in FIGS. 5, 6. So, the adjusting bracket 1 is free to move downwardly when pushed by force.

Figure 7:
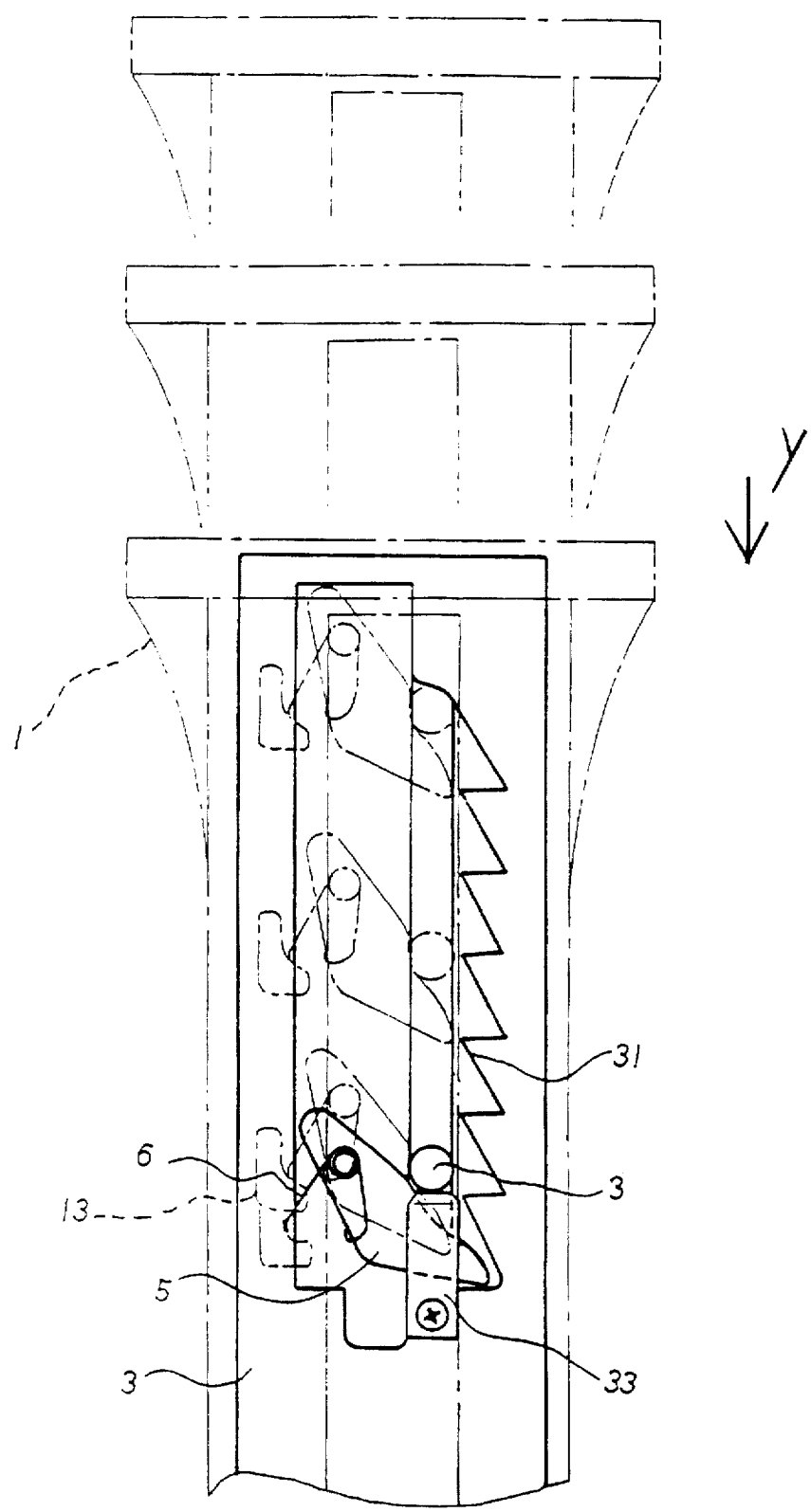
FIG. 7 is a diagram showing the downward push of the adjusting board of the present invention.
Figure 8:
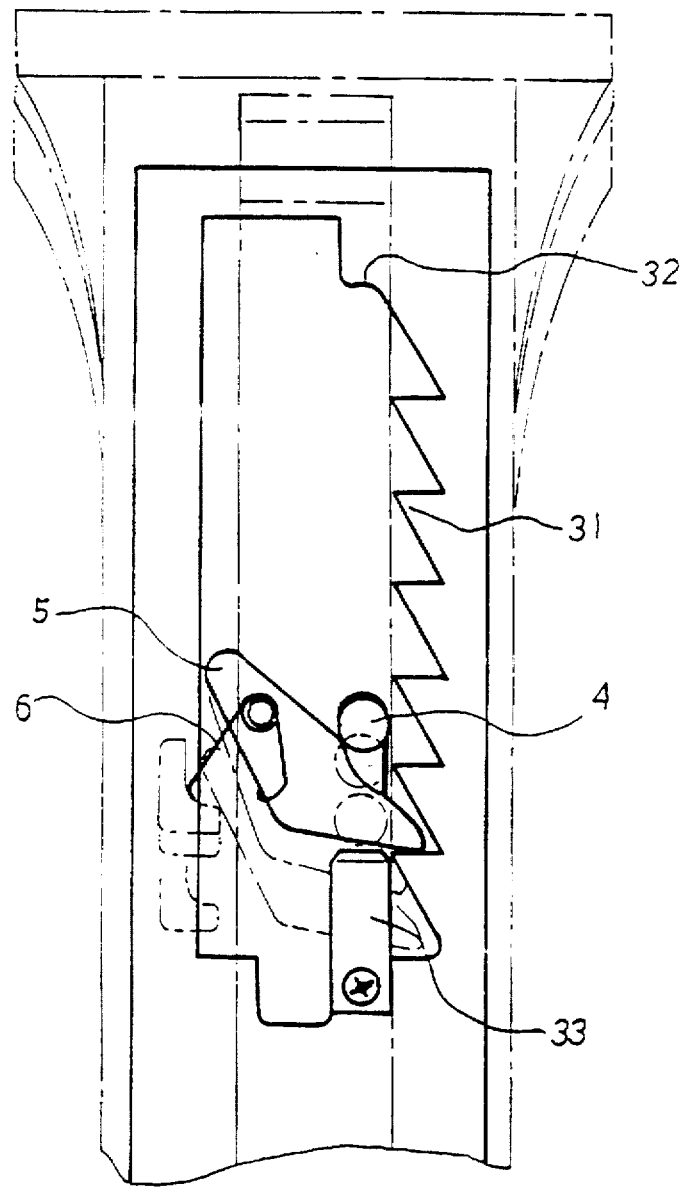
FIG. 8 is a diagram showing the urging plate in abutment against the locking rod of the present invention.

As shown in FIG. 7, when the adjusting bracket 1 is pushed all the way to its bottom end in, the direction of arrow y, the extended limiting member 33 secured to the slide board 3 will move along the downwardly pushed adjusting bracket 1 and urge against the retained locking pole 4 to set it free from the curved sliding portion 52, making the locking pole 4 move to the top of the elliptic through hole 14. Accordingly, the retaining bracket 5 urged by the bias spring 6 will resume its retaining engagement with the dents of the dentate portion 31 of the slide board 3, as shown in FIGS. 7, 8. It is apparent that the armrest of the present invention can be easily adjusted upwardly or downwardly by simple actuation of the adjusting bracket.

I claim:

1. An improved adjusting mechanism having an arm rest for a vehicle seat for varying the height of the armrest, comprising:

an adjusting bracket having a hollow interior having a rectangular groove on one side; at the center of said groove being disposed a first elliptic through hole; a curve-faced block being disposed on one edge of said groove, adjacent said elliptic through hole; a shaft mounting hole being located next to said block;

a cover removably secured to said groove-sided face of said adjusting bracket having a hole defined in alignment with said shaft mounting hole of said adjusting bracket; and a second elliptic through hole being located adjacent said shaft mounting;

a slide board slidably engaged in said adjusting bracket having a lengthwise opening defined thereon; said opening having a dentate portion provided with a plurality of dents on one side of said opening; a protruded abutment shoulder being defined at a first end of said dentate portion and an extended limiting member being secured to a second end of said dentate portion;

a locking pole slidably engaged respectively in said first and second elliptic through hole of said adjusting bracket and said cover and extending through said opening of said slide board, said locking pole being slidably engaged through said second elliptic hole of said cover by a screw;

a shaft having a first end fixed in said mounting hole of said adjusting bracket and a second end position in said hole on said cover;

a retaining ratchet pivotally mounted onto said shaft having a retaining portion and a curved sliding portion;

a bias spring mounted onto said shaft and disposed above said retaining ratchet being engaged with said retaining ratchet at a first hooked end and being in abutment with said curve faced block at a second end so as to make said ratchet retractable;

said retaining ratchet being in limited engagement with said dentate portion of said slide board so as to permit said adjustment mechanism to move only in one direction during adjustment of the armrest thereon;

wherein when said adjustment mechanism is pulled to a top limit, said locking pole is brought down to a lower end of said first elliptic hole of said adjusting bracket by said abutment shoulder of said slide board urging said spring biased retaining ratchet out of limited engagement with said dentate portion so as to permit said adjusting bracket to be upwardly adjusted when said adjusting bracket is moved to a bottom limit of said slide board, wherein said extended limiting member of said slide board abuts against said locking pole which has been retained against said curved sliding portion of said ratchet making said locking pole separate from said ratchet so as to permit the ratchet to resume limited engagement with said dentate portion and permit adjustment of said armrest as said armrest is pulled upward.

* * * * *